(12) United States Patent
Fermum et al.

(10) Patent No.: US 9,530,228 B1
(45) Date of Patent: Dec. 27, 2016

(54) CONTEXT-AWARE GLOSSARIES FOR DATA SETS

(71) Applicant: INTUIT INC., Mountain View, CA (US)

(72) Inventors: Olaf Fermum, Mountain View, CA (US); John Beck McConnico, Mountain View, CA (US); David Dean, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 445 days.

(21) Appl. No.: 13/968,793

(22) Filed: Aug. 16, 2013

(51) Int. Cl.
*G06T 11/20* (2006.01)

(52) U.S. Cl.
CPC .................................. *G06T 11/206* (2013.01)

(58) Field of Classification Search
CPC .......................... G06F 17/3089; G06Q 10/067
See application file for complete search history.

(56) References Cited

U.S. PATENT DOCUMENTS 8,073,801 B1\* 12/2011 von Halle ............ G06Q 10/067
705/1.1
2009/0150345 A1\* 6/2009 Van Luchene ...... G06F 17/3089

\* cited by examiner

*Primary Examiner* — Maurice L McDowell, Jr.
*Assistant Examiner* — Raffi Isanians

(57) ABSTRACT

The disclosed embodiments provide a system that processes data. During operation, the system obtains a data set and metadata corresponding to a data model. Next, the system displays, within a user interface, a visualization of the data model to a user independently of a domain of the data set. The system then uses the metadata to provide a glossary of terms related to the data model in the user interface without requiring configuration of the glossary for use with the data model.

20 Claims, 5 Drawing Sheets

CONTEXT-AWARE GLOSSARIES FOR DATA SETS

RELATED APPLICATION

The subject matter of this application is related to the subject matter in a co-pending non-provisional application by inventors Olaf Fermum, Tim Chaney, Reid Burkhardt and Brian Tharp, entitled "Data-Model-Driven Visualization of Data Sets," having Ser. No. 13/946,542, and filing date 19 Jul. 2013.

BACKGROUND

Related Art

The disclosed embodiments relate to techniques for processing data. More specifically, the disclosed embodiments relate to techniques for providing context-aware glossaries for data sets.

Data visualizations are commonly used to facilitate a user's understanding of data. For example, interactive charts may present relationships, trends, patterns, and/or other attributes related to large sets of complex, interconnected, and/or multidimensional data to the user in a clear and concise manner.

However, existing data visualization mechanisms are associated with a tradeoff between ease of use and flexibility. First, sophisticated data visualization tools may allow users to view graphical representations of various types of data but may also require the users to have detailed understandings of both the tools and the data models for the data. For example, a user may generate a data visualization through a general-purpose data visualization application by manually running queries for specific types of data and configuring the display of charts containing the data based on relationships among the queried data. In addition, the user may not be able to learn about the displayed data without manually filtering and/or searching an extensive glossary of terms for multiple data sets for terms and definitions related to the displayed data.

Second, domain-specific data visualization tools may be relatively easy to use but may be designed around and/or limited to specific data models. For example, a financial data visualization application may allow a user to easily view and interact with graphs, charts, and/or other types of information related to financial market data but may not be able to process and/or display other types of data, additional dimensions associated with the financial market data, and/or additional relationships among the financial market data. In addition, a developer of the financial data visualization application may be required to manually create and/or configure a glossary of terms for the financial market data for use with the displayed financial market data.

Consequently, understanding of large, varied, and/or complex data sets may be facilitated by mechanisms for improving the flexibility and ease of use of data visualization tools.

SUMMARY

The disclosed embodiments provide a system that processes data. During operation, the system obtains a data set and metadata corresponding to a data model. Next, the system displays, within a user interface, a visualization of the data model to a user independently of a domain of the data set. The system then uses the metadata to provide a glossary of terms related to the data model in the user interface without requiring configuration of the glossary for use with the data model.

In some embodiments, the glossary of terms includes at least one of a metric and a set of dimensions associated with the metric.

In some embodiments, the visualization includes at least one of a deconstruction of the metric by the set of dimensions and a trend for the metric.

In some embodiments, the visualization further includes a breakdown of the trend by a dimension from the set of dimensions.

In some embodiments, obtaining the data set and the metadata involves obtaining the metric and the set of dimensions from the metadata, and obtaining the data set as data associated with the metric and the set of dimensions.

In some embodiments, using the metadata to provide the glossary of terms related to the data model in the user interface involves displaying a list of the terms within the user interface, and enabling access to definitions of the terms from the list.

In some embodiments, using the metadata to provide the glossary of terms related to the data model in the user interface further involves obtaining at least one of the terms and the definitions from the metadata.

In some embodiments, using the metadata to provide the glossary of terms related to the data model in the user interface further involves enabling access to other terms related to other data models.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
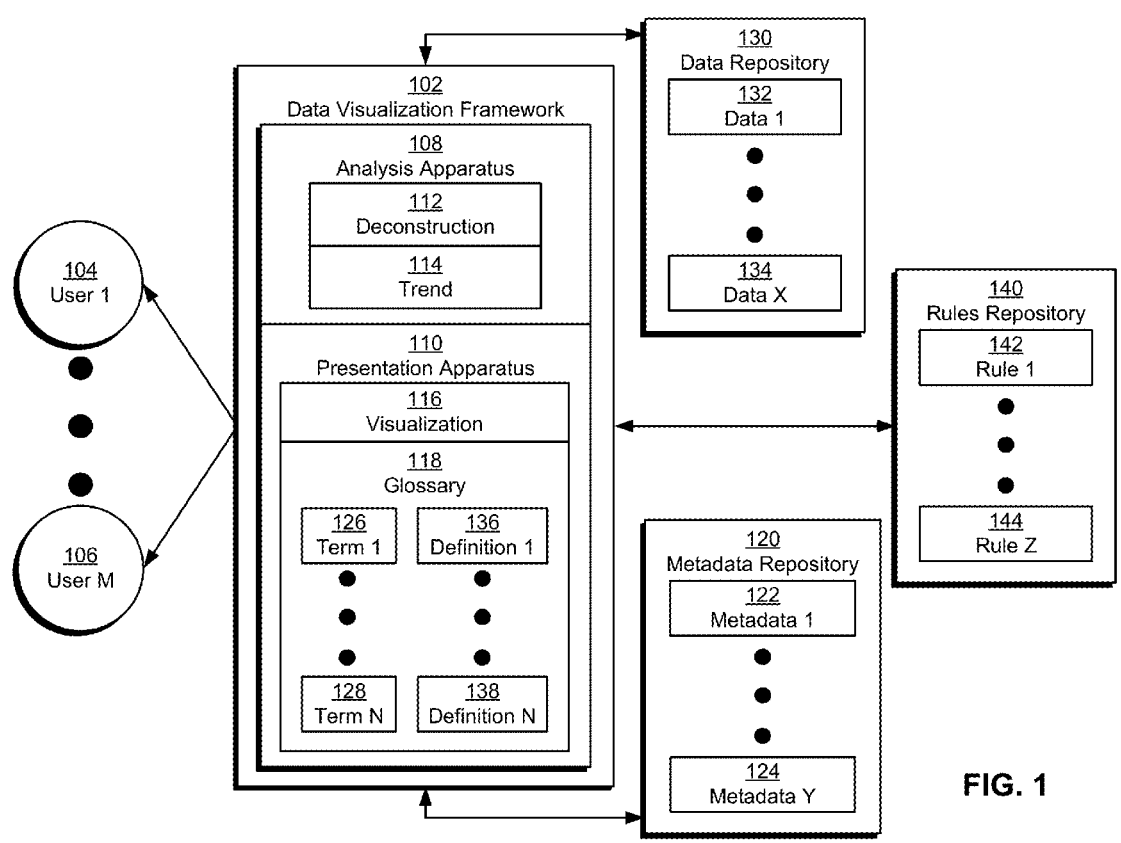
FIG. 1 shows a schematic of a system in accordance with the disclosed embodiments.

The disclosed embodiments relate to a method and system for processing data. As shown in FIG. 1, the system may correspond to a data visualization framework 102 that is accessed by a set of users (e.g., user 1 104, user m 106). Data visualization framework 102 includes an analysis apparatus 108 and a presentation apparatus 110. Each of the components of data visualization framework 102 is described below.

In one or more embodiments, data visualization framework 102 provides data-model-driven visualization of data sets to the users. For example, data visualization framework 102 may allow the users to view graphical representations of different types of data without requiring the users to be familiar with the structure, definition, and/or values of the data. Each data set may be associated with metadata (e.g., metadata 1 122, metadata y 124) that describes a data model of the data set. In turn, the metadata may be used to identify data that is relevant to the data model and thus should be included in the data set. A set of rules (e.g., rule 1 142, rule z 144) may then be applied to the data set to provide one or more visualizations of the data set independently of the domain of the data set.

More specifically, analysis apparatus 108 may obtain a request associated with the data set from a user. The request may specify the name and/or type of the data set and/or other information related to the data set. For example, the user may identify a keyword, category, group, and/or other information that may be used to identify and/or restrict the data set. Analysis apparatus 108 may use the information to retrieve the metadata for the data set from a metadata repository 120 by, for example, performing a query for metadata matching the information.

Next, analysis apparatus 108 may use the metadata to identify the data model for the data set. The metadata may include a metric and a set of dimensions associated with the metric. In other words, analysis apparatus 108 may obtain a star schema, snowflake schema, and/or other representation of the data model from the metadata. Once the metric and set of dimensions are obtained from the metadata, analysis apparatus 108 may obtain data (e.g., data 1 132, data x 134) associated with the metric and set of dimensions from a data repository 130. For example, analysis apparatus 108 may use the metadata to perform one or more queries with one or more databases containing data associated with the metadata.

Analysis apparatus 108 may also obtain a set of rules from a rules repository 140 and apply the rules to the data to obtain a deconstruction 112 of the metric by the set of dimensions, as well as a trend 114 for the metric. Deconstruction 112 may split the metric along one or more dimensions, and trend 114 may indicate changes to the metric over time.

Alternatively, the metadata may represent other types of data models, such as entity-relationship models, object-role models, and/or Unified Modeling Language (UML) models. Analysis apparatus 108 may use the metadata to identify tables, columns, classes, and/or tags associated with the data set and retrieve data stored under the tables, columns, classes, and/or tags. Analysis apparatus 108 may also apply rules associated with the data model from rules repository 140 to the data set to identify patterns, relationships, and/or characteristics associated with the data.

Presentation apparatus 110 may then display a visualization 116 of the data model to the user. For example, presentation apparatus 110 may display visual representations of deconstruction 112, trend 114, and/or other applications of rules to the data in one or more charts to the user. The chart(s) may be shown within a graphical user interface (GUI), web-based user interface, and/or other type of user interface provided by presentation apparatus 110.

As a result, the graphical representations of data shown within presentation apparatus 110 may change as rules are added, modified, and/or removed from rules repository 140. In other words, visualization 116 may be adapted to different types of data without requiring the user to use a complex, general-purpose data visualization tool and/or acquire in-depth knowledge of the data's domain and/or data model. Data visualization framework 102 may thus reduce the overhead associated with using conventional general-purpose data visualization tools while providing increased flexibility and/or customization of data visualizations (e.g., charts) over those of domain-specific data visualization mechanisms.

Presentation apparatus 110 may further enable interaction with and/or configuration of the charts by the user. For example, presentation apparatus 110 may allow the user to view deconstruction 112 and/or trend 114 using different timescales and/or granularities of a time dimension for the metric. Presentation apparatus 110 may also allow the user to specify a dimension associated with the metric and view a breakdown of trend 114 by the dimension. Viewing of and/or interaction with charts for domain-independent visualization of data sets is discussed in a co-pending non-provisional application by inventors Olaf Fermum, Tim Chaney, Reid Burkhardt and Brian Tharp, entitled "Data-Model-Driven Visualization of Data Sets," having Ser. No. 13/946,542, and filing date Jul. 19, 2013, which is incorporated herein by reference.

In one or more embodiments, data visualization framework 102 further facilitates user understanding of the data set and/or visualization 116 by providing a glossary 118 of terms (e.g., term 1 126, term n 128) related to the data model within the user interface. In particular, glossary 118 may include terms related to various components of the data model, as well as definitions (e.g., definition 1 136, definition n 138) of the terms. For example, presentation apparatus 110 may show a list of the terms within glossary 118 and enable access to definitions of the terms from the list (e.g., through a set of links).

Presentation apparatus 110 may also enable access to other terms related to other data models from glossary 118. For example, presentation apparatus 110 may provide a link that allows the user to view a comprehensive list of terms associated with all data models to which the user has access.

The user may then select a term within the list to view and/or obtain a definition of the term. Providing glossaries for data models of data sets based on contexts of the data models is discussed in further detail below with respect to FIG. 3.

As with the display of visualization 116, glossary 118 may be provided without requiring configuration of glossary 118 for use with the data model. Instead, the terms and/or definitions in glossary 118 may be obtained from the metadata for the data model and/or other data structures associated with the data model, as described in further detail below with respect to FIG. 2. Because information in glossary 118 is obtained directly from the data model, a developer may not be required to create and/or maintain a separate file for terms and/or definitions in glossary 118. At the same time, the user may easily obtain definitions of terms in the data model through glossary 118 without filtering and/or searching an extensive glossary of terms and definitions for multiple data sets for terms and definitions that are relevant to the data model shown in visualization 116. In other words, data visualization framework 102 may provide a "context-aware" glossary 118 that simplifies both inclusion of relevant terms and definitions in glossary 118 by the developer and lookup of the terms and definitions by the user.

Those skilled in the art will appreciate that the system of FIG. 1 may be implemented in a variety of ways. First, analysis apparatus 108, presentation apparatus 110, metadata repository 120, data repository 130, and rules repository 140 may be provided by a single physical machine, multiple computer systems, one or more virtual machines, a grid, one or more databases, one or more filesystems, and/or a cloud computing system. In addition, analysis apparatus 108 and presentation apparatus 110 may be implemented together and/or separately by one or more hardware and/or software components and/or layers.

Second, data, metadata, and/or rules associated with data visualization framework 102 may be stored, defined, and/or transmitted using a number of techniques. For example, data visualization framework 102 may be configured to accept data, metadata, and/or rules from different types of repositories, including relational databases, graph databases, data warehouses, filesystems, and/or flat files. Data visualization framework 102 may also obtain and/or transmit data, metadata, and/or rules in a number of formats, including database records, property lists, Extensible Markup language (XML) documents, JavaScript Object Notation (JSON) objects, and/or other types of structured data.

Figure 2:
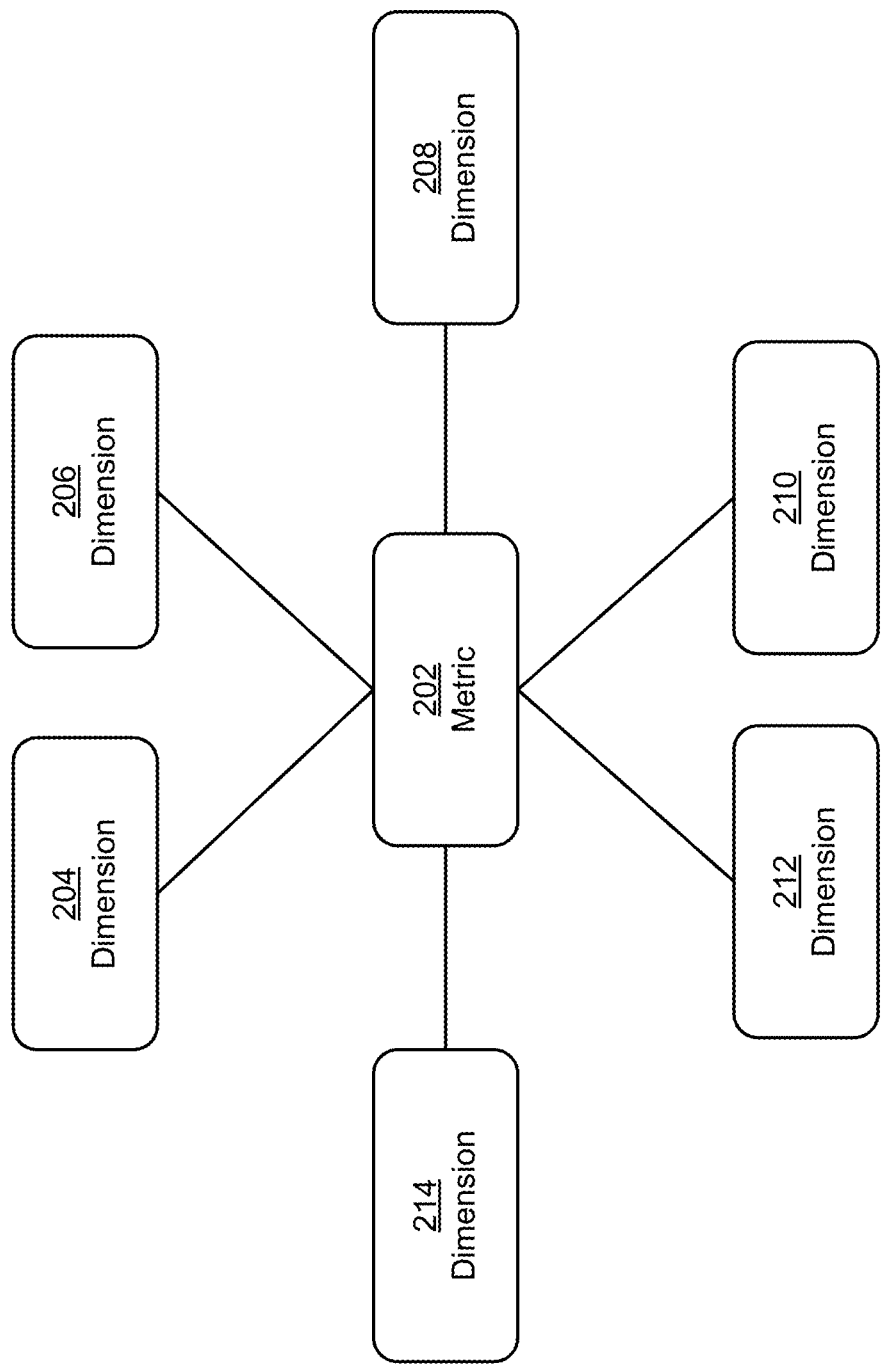
FIG. 2 shows a data model in accordance with the disclosed embodiments.

FIG. 2 shows a data model in accordance with the disclosed embodiments. As shown in FIG. 2, the data model includes a metric 202 and a set of dimensions 204-214 associated with metric 202. In other words, metric 202 and dimensions 204-214 may correspond to a star schema for a data set.

Metric 202 may represent the measurable and/or quantitative aspect of the data set. As a result, data associated with metric 202 may include one or more numeric quantities. For example, metric 202 may correspond to a sales price, a sale quantity, a quantity, a number of page views, a distance, a weight, a rating, and/or a temperature. In addition, records associated with metric 202 may be associated with specific events, points in time, and/or periods of time. For example, numeric values associated with metric 202 may be obtained at events that potentially affect the values, at periodic intervals (e.g., daily, weekly, monthly, etc.) that are generally independent of the values, and/or as cumulative measurements (e.g., averages, sums, etc.) over the periodic intervals.

Dimensions 204-214 may categorize, characterize, group, and/or label otherwise unordered values for metric 202. Each dimension 204-214 may include a set of limited and/or fixed possible values. For example, dimensions 204-214 may specify a person's country, state, and/or city of residence; a computer's operating system; a model of a car, electronic device, and/or appliance; a passing or failing of a test; a name of a product; an age range; and/or a language. In addition, each value of metric 202 may be associated with a set of values for dimensions 204-214. For example, a record containing a value of a metric for a sale price may also include values for a product, sales promotion, market, and/or customer associated with the sale price.

To enable identification of trends associated with metric 202, dimensions 204-214 may also include a time dimension that orders and/or groups values for metric 202 by date, time, and/or time period. The time dimension may also be associated with different granularities. For example, the time dimension may be associated with timestamps and/or time intervals that are per second, minute, hour, day, week, month, quarter, and/or year.

As mentioned above, the data model may be defined and/or described using metadata. The metadata may thus specify and/or define metric 202, dimensions 204-214, and/or granularities associated with one or more dimensions 204-214. For example, metadata for a "Page Views" metric may include the following:

```
"metrics": [
  {
    "id": "1",
    "displayName": "Page Views",
    "description": "The count of web pages loaded to a visitor's
      browser (includes pages refreshed, reloaded and pulled
      from a cache). The number of page views is measured
      additively over time.",
    "additive": "Y",
    "units": "1",
    "dimensions": [
      "1",
      "4",
      "12"
    ],
    "availability": [
      {
        "biz": "1",
        "grain": "1",
        "date": "2010-10-01",
        "lastDate": "2012-05-22"
      },
"units": [
  {
    "id": "1",
    "displayName": "Count"
  },
  {
    "id": "2",
    "displayName": "Seconds"
  },
  {
    "id": "3",
    "displayName": "Percent"
  },
  {
    "id": "4",
    "displayName": "Dollars"
  },
  {
    "id": "5",
    "displayName": "Average"
  },
  {
    "id": "6",
    "displayName": "Rank"
```

```
        }
    ],
    "dimensions": [
        {
            "id": "1",
            "displayName": "Browser",
            "enumerations": {
                "−1": "Unknown",
                "0": "All",
                "1": "Internet Explorer",
                "2": "Other",
                "3": "Firefox",
                "4": "Safari",
                "5": "Chrome"
            }
        },
        {
            "id": "4",
            "displayName": "Operating System",
            "enumerations": {
                "−1": "Unknown",
                "0": "All",
                "1": "Other",
                "2": "Unix / Linux",
                "4": "Mac",
                "5": "iOS Phone",
                "6": "Windows"
            }
        },
        {
            "id": "12",
            "displayName": "Page Type",
            "enumerations": {
                "−1": "Unknown",
                "0": "All",
                "1": "Marketing",
                "2": "Product",
                "3": "Customer Care"
            }
        }
    ],
    "bizHierarchy": [
        {
            "id": "1",
            "displayName": "Intuit",
            "type": "corp",
            "children": [
                {
                    "id": "27",
                    "displayName": "APD",
                    "type": "franchise",
                    "children": [
                        {
                            "id": "31",
                            "displayName": "Acct Solns",
                            "type": "BU",
                            "children": [
                                {
                                    "id": "32",
                                    "displayName": "Professional Advisors Program",
                                    "type": "offering"
                                },
                                {
                                    "id": "33"
                                    "displayName": "QB Accountant Edition",
                                    "type": "offering"
                                }
                            ]
                        },
    "grains": [
        {
            "id": "1",
            "displayName": "Daily"
        },
        {
            "id": "2",
            "displayName": "Weekly"
        },
        {
            "id": "3",
            "displayName": "Monthly"
        },
        {
            "id": "4",
            "displayName": "Quarterly"
        }
    ]
```

Within the metadata, the "Page Views" metric includes a description of "The count of web pages loaded to a visitor's browser (includes pages refreshed, reloaded and pulled from a cache). The number of page views is measured additively over time." The description may be included in a glossary of terms related to the data model, such as glossary 118 of FIG. 1. Alternatively, a definition of the "Page Views" metric may be obtained from a separate glossary table containing definitions of terms associated with the data model and/or other data models. The metric may also be additive and have numeric values with units of "Count."

The metric is associated with three dimensions, all of which may have possible values of "Unknown" and a value of "All." The "Browser" dimension also includes possible values of "Internet Explorer," "Other," "Firefox," "Safari," and "Chrome." The "Operating System" dimension includes possible values of "Other," "Unix/Linux," "Mac," "iOS Phone," and "Windows." The "Page Type" dimension includes possible values of "Marketing," "Product," and "Customer Care." A description (not shown) of each dimension may also be included in the metadata for use in defining the dimension within the glossary.

The metadata also includes a "bizHierarchy" element that describes a business hierarchy associated with the metric. The business hierarchy includes a parent of "Intuit" with a child of "APD," which in turn has children named "Acct Solns," "Professional Advisors Program," and "QB Accountant Edition." The business hierarchy may provide additional context for the data associated with the metric and dimensions.

Finally, the metadata includes a set of "grains" describing different granularities of time, including "Daily," "Weekly," "Monthly," and "Quarterly." Values of the "Page Views" metric may be accumulated (e.g., added) within time intervals represented by each granularity to enable viewing and/or grouping of the metric and/or associated dimensions at the granularity.

Figure 3:
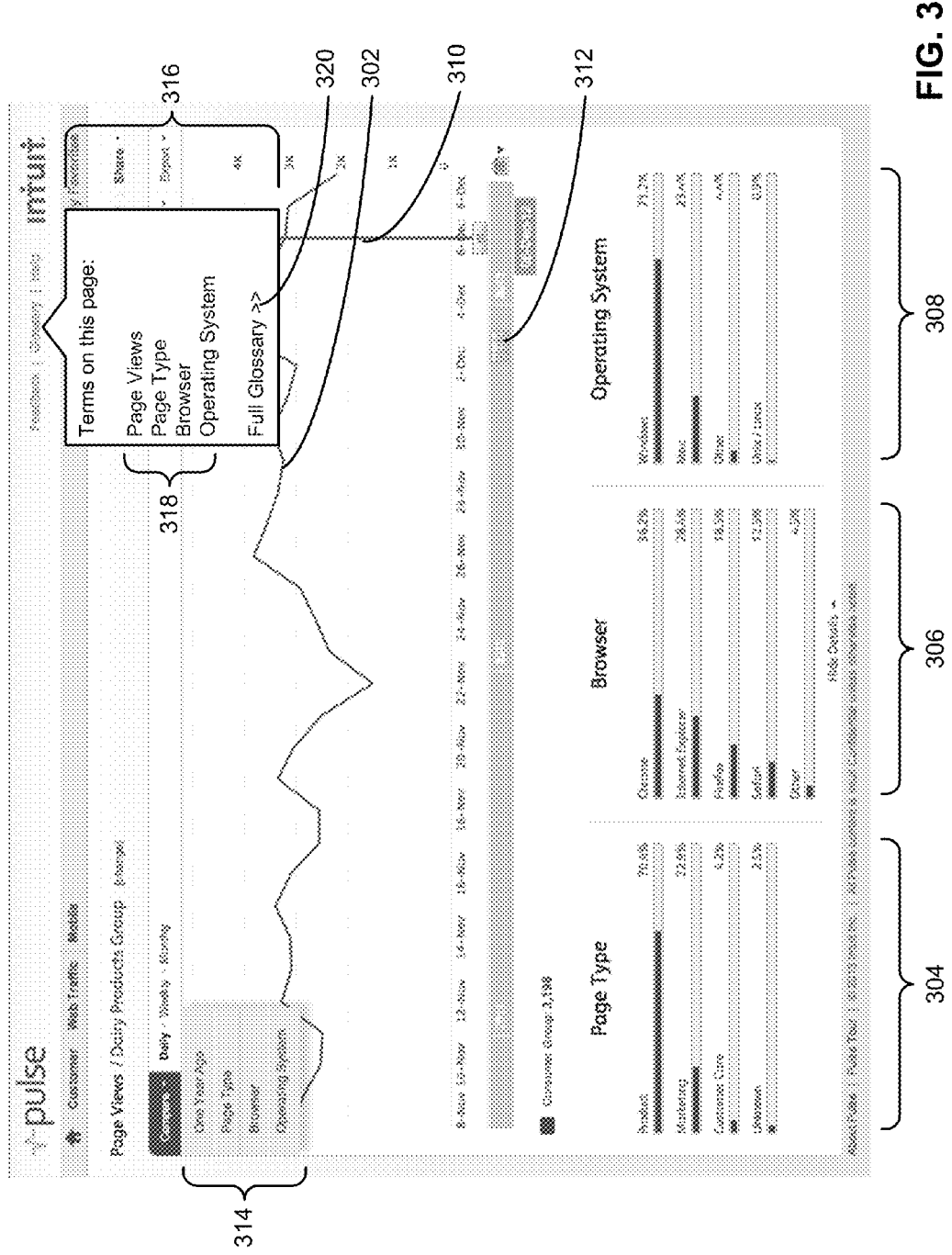
FIG. 3 shows an exemplary screenshot in accordance with the disclosed embodiments.

FIG. 3 shows an exemplary screenshot in accordance with the disclosed embodiments. More specifically, FIG. 3 shows a screenshot of a user interface for displaying data-model-driven visualizations of data sets. As mentioned above, the user interface may include one or more charts that facilitate understanding of a data set by a user independently of the data model and/or domain of the data set.

In particular, the user interface of FIG. 3 may display a line chart of a trend 302 for a "Page Views" metric at a "Dairy Products Group" level of a business hierarchy. The user interface may also display a set of charts containing a deconstruction of the metric by a set of dimensions 304-308. Trend 302 may span a month and show changes in the value of the metric over the course of the month. Within the chart for trend 302, the user interface may provide a slider 310 for selecting a particular date under which the metric is to be deconstructed.

After a date is specified using slider 310, the user interface may display a set of bar charts representing the frequencies of values for dimensions 304-308 under that date as a set of percentages associated with the values. For example, the user interface may show a split of a "Page Type" metric 304 into percentages of possible values of "Product," "Marketing," "Customer Care," and "Unknown." The user interface may also show a split of a "Browser" metric 306 into percentages of possible values of "Chrome," "Internet Explorer," "Firefox," "Safari," and "Other." Finally, the user interface may show a split of an "Operating System" metric 308 into percentages of possible values of "Windows," "Mac," "Other," and "Unix/Linux."

If no date is specified, slider 310 may be set to the latest available date in the time interval. The dates and/or time interval covered by the chart may also be adjusted by manipulating a scrollbar 312 underneath the chart for trend 302. In other words, the user interface of FIG. 3 may provide views of trend 302 and the deconstruction of trend 302 into dimensions 304-308 along different timescales, time periods, and/or granularities.

The user interface may also provide a set of options 314 associated with dimensions 304-308 and/or other dimensions for the metric. The user may select one of the displayed options 314 to view a breakdown of the metric by the corresponding dimension, as discussed in the above-referenced application.

Finally, the user interface may provide a glossary 316 of terms related to the data model, such as terms corresponding to the metric and dimensions shown in the user interface. As shown in FIG. 3, the glossary may be overlaid on the chart and/or other parts of the user interface and include a list 318 of the terms (e.g., "Page Views," "Page Type," "Browser," "Operating System"). Each term in the list may include a link to the definition of the term and/or information related to the source of data related to the term. As a result, the user may obtain the definition by selecting the term using a cursor, finger, and/or other input mechanism associated with the user interface. After a particular term is selected, the user interface may navigate to a different screen of the user interface containing the definition of the term and/or update the overlay within which glossary 316 is displayed with the definition of the term. In addition, the exclusion of terms that are not relevant to the data model from list 318 may allow the user to learn about the data model without filtering and/or searching a comprehensive glossary of terms related to all data models accessible by the user.

On the other hand, glossary 316 may also include a link 320 (e.g., "Full Glossary") that enables access to terms related to other data models outside list 318. For example, selection of link 320 may cause the user interface to navigate to a screen containing an alphabetized list of terms for all data models accessible within the user interface.

Figure 4:
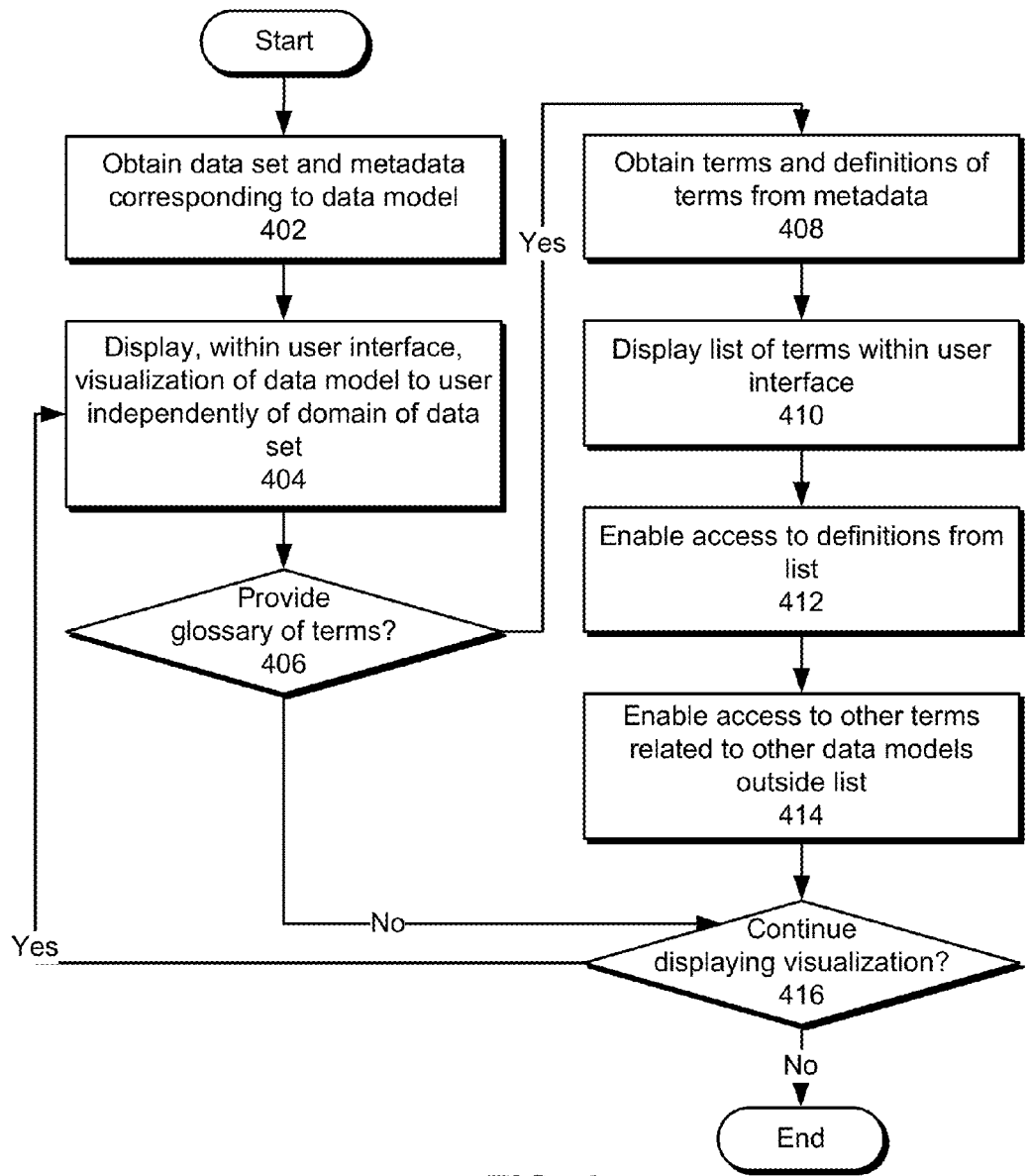
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a data set and metadata corresponding to a data model are obtained (operation 402). The metadata may specify a metric and a set of dimensions associated with the metric. After the metric and dimensions are obtained from the metadata, data associated with the metric and the dimensions may be obtained (e.g., from a data repository). The metadata may also describe a data model that includes components in lieu of or in addition to the metrics and/or dimensions. Data associated with the components may then be obtained based on information for the components in the metadata.

Next, a visualization of the data model is displayed to the user within a user interface independently of a domain of the data set (operation 404). For example, the visualization may include one or more charts containing a deconstruction of a metric by a set of dimensions, a trend for the metric, and/or a breakdown of the metric by one of the dimensions.

A glossary of terms related to the data model may also be provided (operation 406) within the user interface. If the glossary is not to be provided and/or shown, the visualization may continue to be displayed (operation 416) without the glossary. For example, the glossary may not be provided and/or shown if the user has not selected a link, button, and/or other user-interface for activating the glossary.

If the glossary is to be provided, the terms and definitions of the terms are obtained from the metadata (operation 408). For example, the terms may represent components of the data model specified in the metadata, and definitions of the terms may be obtained from descriptions of the components in the metadata and/or another data source associated with the data model. Next, a list of the terms is displayed within the user interface (operation 410), and access to the definitions is enabled from the list (operation 412). For example, each term in the list may include a link to the corresponding definition, and the user may select the term to access the definition through the link.

Access to other terms related to other data models may also be enabled (operation 414). For example, a link to a comprehensive glossary of terms related to all data models accessible through the user interface may be provided. The initial, "context-aware" list of terms may facilitate efficient discovery of information about the data model, while the comprehensive glossary may increase the breadth and/or scope of information available to the user within the user interface.

The visualization may continue to be displayed (operation 416) during use of the user interface by the user. During display of the visualization (operation 404), a glossary of terms related to the data model may be provided (operations 406-414) to facilitate understanding of the data model by the user. Display of the visualization and/or glossary may continue (operation 416) until the user no longer uses the user interface.

Figure 5:
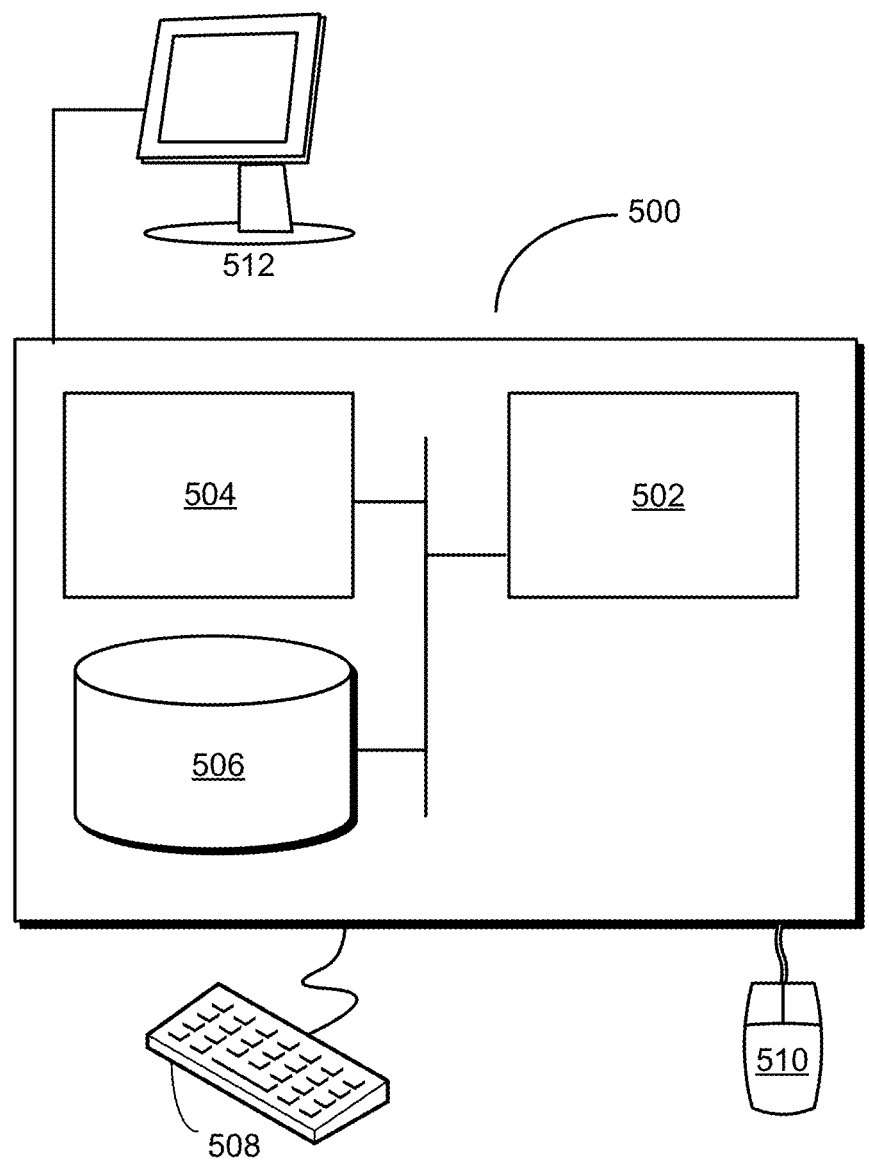
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system may include an analysis apparatus that obtains a data set and metadata corresponding to a data model. The data model may include a metric and a set of dimensions associated with the metric. The system may also include a presentation apparatus that displays, within a user interface, a visualization of the data model to a user independently of a domain of the data set. The presentation apparatus may also use the metadata to provide a glossary of terms related to the data model in the user interface without requiring configuration of the glossary for use with the data model.

In addition, one or more components of computer system 500 may be remotely located and connected to the other components over a network. Portions of the present embodiments (e.g., analysis apparatus, presentation apparatus, etc.) may also be located on different nodes of a distributed system that implements the embodiments. For example, the present embodiments may be implemented using a cloud computing system that provides visualizations and/or definitions of various types of data to a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing data, comprising:
    obtaining, by a computer, metadata that describes a data model of a data set, wherein the metadata is related to a category;
    identifying by the computer, based on the metadata, data relevant to the data model to include in the data set to restrict the data set to the category;
    applying by the computer, one or more rules to the data set independent of the category;
    displaying, by the computer within a user interface, a visualization of the data model of the data set; and
    using the metadata, by the computer, to provide a glossary of terms related to the data model in the user interface without requiring pre-configuration of the glossary for use with the data model.

2. The computer-implemented method of claim 1, wherein the glossary of terms comprises at least one of:
    a metric; and
    a set of dimensions associated with the metric.

3. The computer-implemented method of claim 2, wherein the visualization comprises at least one of:
    a deconstruction of the metric by the set of dimensions; and
    a trend for the metric.

4. The computer-implemented method of claim 3, wherein the visualization further comprises:
    a breakdown of the trend by a dimension from the set of dimensions.

5. The computer-implemented method of claim 2, wherein identifying the data to include in the data set involves:
    obtaining the metric and the set of dimensions from the metadata; and
    identifying the data associated with the metric and the set of dimensions.

6. The computer-implemented method of claim 1, wherein using the metadata to provide the glossary of terms related to the data model in the user interface involves:
    displaying a list of the terms within the user interface; and
    enabling access to definitions of the terms from the list.

7. The computer-implemented method of claim 6, wherein using the metadata to provide the glossary of terms related to the data model in the user interface further involves:
    obtaining at least one of the terms and the definitions from the metadata.

8. The computer-implemented method of claim 6, wherein using the metadata to provide the glossary of terms related to the data model in the user interface further involved:
    enabling access to other terms related to other data models.

9. A system for processing data, comprising:
    an analysis apparatus configured to:
        obtain metadata that describes a data model of a data set, wherein the metadata is related to a category;
        identify, based on the metadata, data relevant to the data model to include in the data set to restrict the data set to the category; and
        apply one or more rules to the data set independent of the category, and a presentation apparatus configured to:
        display, within a user interface, a visualization of the data model of the data set; and
        use the metadata to provide a glossary of terms related to the data model in the user interface without requiring pre-configuration of the glossary for use with the data model.

10. The system of claim 9, wherein the glossary of terms comprises at least one of:
    a metric; and
    a set of dimensions associated with the metric.

11. The system of claim 10, wherein the visualization comprises at least one of:
    a deconstruction of the metric by the set of dimensions;
    a trend for the metric; and
    a breakdown of the trend by a dimension from the set of dimensions.

12. The system of claim 10, wherein identifying the data to include in the data set involves:
    obtaining the metric and the set of dimensions from the metadata; and
    identifying the data associated with the metric and the set of dimensions.

13. The system of claim 9, wherein using the metadata to provide the glossary of terms related to the data model in the user interface involves:
    obtaining at least one of the terms and definitions of the terms from the metadata;
    displaying a list of the terms within the user interface; an enabling access to the definitions from the list.

14. The system of claim 13, wherein using the metadata to provide the glossary of terms related to the data model in the user interface further involves:
    enabling access to other terms related to other data models.

15. A non-transitory computer-readable storage medium storing instructions that when executed by a computer cause the computer to perform an method for processing data, the method comprising:
    obtaining metadata that describes a data model of a data set, wherein the metadata is related to a category;
    identifying based on the metadata, data relevant to the data model to include in the data set to restrict the data set to the category;

applying one or more rules to the data set independent of the category;

displaying, within a user interface, a visualization of the data model of the data set; and using the metadata to provide a glossary of terms related to the data model in the user interface without requiring pre-configuration of the glossary for use with the data model.

16. The non-transitory computer-readable storage medium of claim 15, wherein the glossary of terms comprises at least one of:

a metric; and a set of dimensions associated with the metric.

17. The non-transitory computer-readable storage medium of claim 16, wherein the visualization comprises at least one of:

a deconstruction of the metric by the set of dimensions;

a trend for the metric; and a breakdown of the trend by a dimension from the set of dimensions.

18. The non-transitory computer-readable storage medium of claim 16, wherein identifying the data to include in the data set involves:

obtaining the metric and the set of dimensions from the metadata; and identifying the data associated with the metric and the set of dimensions.

19. The non-transitory computer-readable storage medium of claim 15, wherein using the metadata to provide the glossary of terms related to the data model in the user interface involves:

obtaining at least one of the terms and definitions of the terms from the metadata;

displaying a list of the terms within the user interface; and enabling access to the definitions from the list.

20. The non-transitory computer-readable storage medium of claim 19, wherein using the metadata to provide the glossary of terms related to the data model in the user interface further involves:

enabling access to the other terms related to other data models.

* * * * *